March 26, 1963 W. H. BRINK ETAL 3,083,332
VOLTAGE REGULATING SYSTEM
Filed Feb. 26, 1959
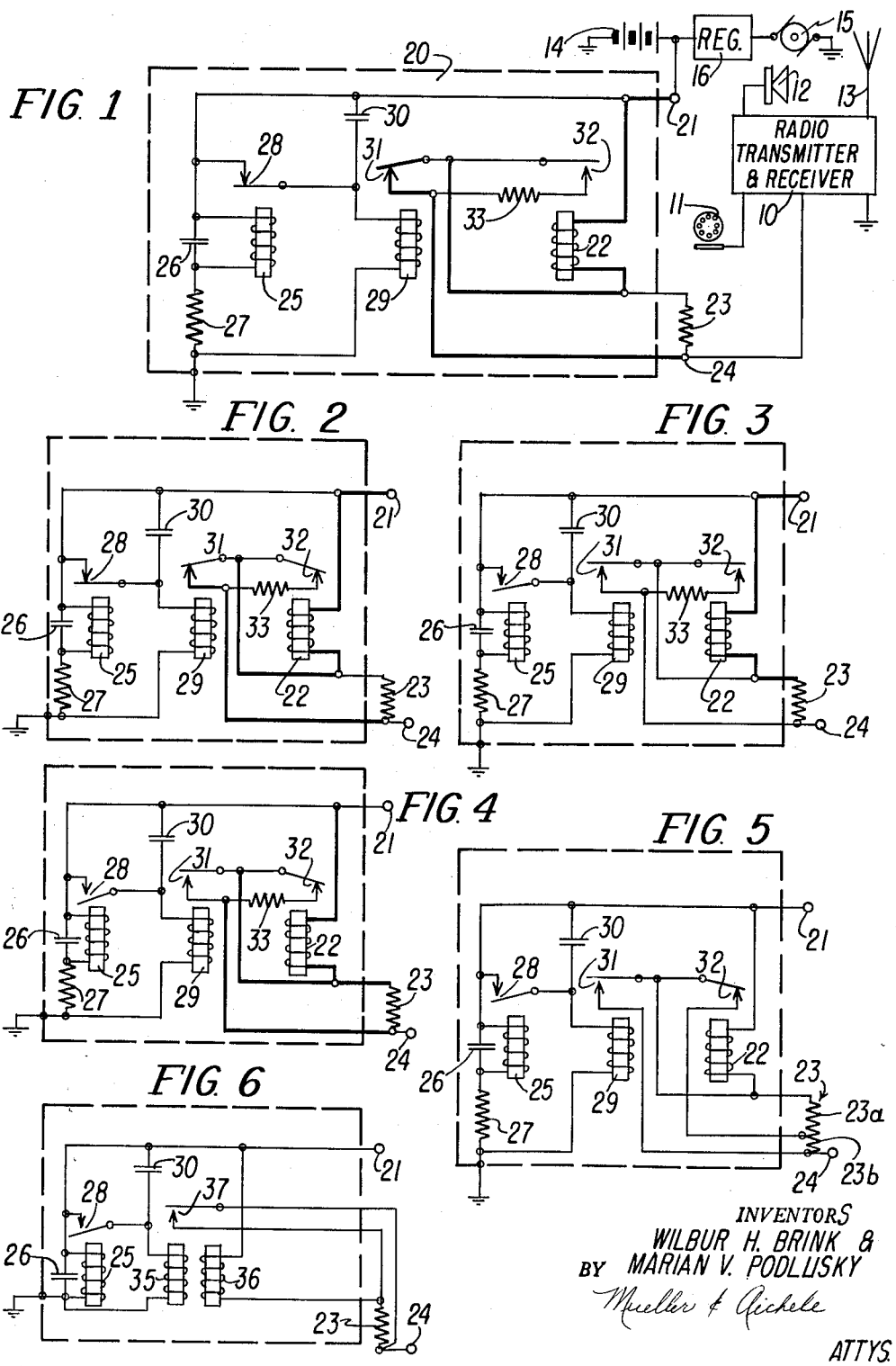
INVENTORS
WILBUR H. BRINK &
BY MARIAN V. PODLUSKY
Mueller & Aichele
ATTYS.

United States Patent Office 3,083,332
Patented Mar. 26, 1963

3,083,332
VOLTAGE REGULATING SYSTEM
Wilbur H. Brink, Morton Grove, and Marian V. Podlusky, Chicago, Ill., assignors to Motorola, Inc., Chicago, Ill., a corporation of Illinois
Filed Feb. 26, 1959, Ser. No. 795,767
7 Claims. (Cl. 323—66)

This invention relates generally to voltage regulators and more particularly to voltage regulators for use with two-way mobile radio equipment operated from an automobile electrical system which is subject to wide variations in voltage.

Voltage regulators are used in many applications to provide operating voltage from a source which varies through a wide range for holding the voltage in a range suitable for use by equipment energized therefrom. One such application is in connection with equipment energized from the electrical system of an automobile wherein the voltage of a nominal 12-volt system may vary from 10 volts or less to 16 volts or more, depending upon the condition of the battery and the operation of the automobile generator. This wide range of voltage may cause damage to equipment at the high voltages or may cause improper operation at both low and high voltages.

A further problem is presented in connection with 2-way radio equipment in that the load of the radio equipment on the electrical system will have a first value during reception and a much greater value during transmission. Accordingly the regulator must hold the voltage within proper limits at two different current rates. Voltage regulators for providing corrective regulation for wide variations in source voltage and load current have been quite complex and expensive and have not been entirely satisfactory in operation.

It is therefore an object of this invention to provide a relatively simple voltage regulator for protecting mobile radio equipment from excessive voltage variations produced by an automobile electrical system.

A further object is to provide a voltage regulator which holds the voltage applied to the energized equipment within a desired range of voltage values when operating under conditions in which currents of widely differing values are drawn by the equipment.

Another object of the invention is to provide a voltage regulator for use with 2-way radio equipment wherein the voltage is reduced when the voltage exceeds a predetermined level, with the reduction being effective both for low current drain during receiver operation and for high current drain during transmitter operation.

A feature of the invention is the provision of a voltage regulator including a first relay operative when the voltage exceeds a predetermined value and a second relay operable when the current drawn exceeds a predetermined value, with the first relay being effective to add resistance in the circuit to provide a voltage drop thereacross, and the second relay bridging the resistance to change the effective resistance with the current drawn.

Another feature of the invention is the provision of a voltage regulator including a voltage sensitive relay which controls a slave relay which is operative to increase the series resistance in the power supply line when the voltage exceeds a predetermined value, and which together with a current sensitive relay controls the effective resistance in the energizing line with the current drawn.

The invention is illustrated in the following drawings in which:

FIG. 1 shows the voltage regulator in a mobile radio system;

FIGS. 2 to 4 inclusive show the voltage regulator in various conditions of operation;

FIG. 5 shows an alternate construction of the voltage regulator; and

FIG. 6 shows another construction of the voltage regulator.

The invention provides a voltage regulator for supplying electrical potential from the electrical system of an automobile to radio communication equipment installed in the automobile. The system includes a voltage sensitive relay which is energized when the voltage exceeds a predetermined value. The voltage sensitive relay controls a slave relay which has contacts capable of carrying the load current. The contacts to the slave relay are bridged across a resistor connected in series in the potential supply line and are closed to short out the resistor when the voltage is below the predetermined value. The voltage sensitive relay releases the slave relay when the voltage exceeds a predetermined value so that the contacts thereof open, and the current flowing through the resistor provides a voltage drop which reduces the voltage applied to the equipment. A current sensitive relay is connected in series in the energizing line and also includes contacts bridging at least a part of the resistor. Accordingly when heavy current is drawn the resistance is reduced and the required potential is applied to the equipment. A small resistor may be provided in series with the current sensitive relay contacts to reduce the potential when the voltage of the electrical system exceeds a predetermined value. However, the heavy current produces a substantial voltage drop in the cabling connecting the equipment and resistance may not be required.

Referring now to the drawings, in FIG. 1 there is illustrated a mobile radio communication system including a radio transmitter and receiver 10 having a microphone 11 for applying signals to the transmitter and a loudspeaker 12 for reproducing received signals. An antenna 13 is provided which may be connected to the transmitter and receiver during transmission and reception respectively. The radio transmitter and receiver 10 is energized from the electrical system of an automobile including battery 14 and generator 15. The generator 15 is selectively controlled by the regulator 16. The potential applied to the radio transmitter and receiver is controlled by voltage regulator 20 which will be described in more detail.

The voltage regulator 20 includes a supply circuit from the automobile electrical system to the radio transmitter and receiver which extends from terminal 21 through the winding of relay 22 and resistor 23 to the output terminal 24. The potential is applied with respect to ground as illustrated. Connected to the input terminal 21 is a voltage sensitive relay 25, the winding of which is bridged by capacitor 26 and connected to ground through resistor 27. The resistor 27 is used to provide the proper operating voltage for relay 25 and may be omitted if the relay operates on the voltage applied to terminal 21. The relay 25 includes contacts 28 which when released as shown in FIG. 1 connect the winding of relay 29 from the input terminal 21 to ground. Capacitor 30 bridges the contacts 28. The relay 29 is a slave relay having contacts 31 which are capable of carrying the load current of the equipment energized thereby. The contacts 31 are bridged across resistor 23 and provide a low resistance path across resistor 23 when the relay 29 is operated. The relay 22 in the main energizing line is a current sensitive relay having contacts 32 which in series with resistor 33 bridge the resistor 23.

The battery 14 and generator 15 provide a voltage which may vary over a wide range. In a system having a nominal 12 volt battery, the voltage may very from less than 10 volts to more than 16 volts depending upon the condition of the battery 14 and the operation of the generator 15. The radio transmitter and receiver must be designed to operate from the minimum voltage which will be provided, and the maximum voltage of the system is sufficiently high that the application of such a voltage to the radio transmitter and receive may damage the same. The radio transmitter and receiver draws a relatively low current during receiver or standby operation and a much higher current during transmitter operation. As a example the current drain during reception may be from 5 to 7 amperes and the drain during transmission between 13 and 19 amperes. Regulators can be used for larger current drains with the limit being determined by the coils used and the current carrying capacity of the contacts. Generators have been provided for systems drawing 35 amperes. The voltage regulator operates to reduce the voltage applied to the radio transmitter and receiver when the voltage of the electrical system exceeds a predetermined value. As an example, it may reduce the voltage when the electrical system has a voltage exceeding 14 volts.

Considering now the operation of the system, the voltage sensitive relay 25 is selected to operate when the voltage exceeds the value which is considered to be the maximum satisfactory voltage. As stated above, 14 volts may be used as an example. The relay 25 may be quite accurate since only small contacts are required to control the energization of the slave relay 29. When the voltage of the battery falls below 13.5 volts, relay 25 will be de-energized and the contacts 28 thereof will close to energize slave relay 29. The slave relay will close its contacts 31 to bridge resistor 23 and establish a connection through the voltage regulator producing small voltage drop. The contacts of the slave relay are adequate to carry the load current. Accordingly, substantially the entire voltage of the electrical system is applied to the radio transmitter and receiver. This is the connection shown in FIG. 1 of the drawings and the current supply path is shown in heavy lines.

As previously stated the relay 22 is a current sensitive relay and will operate when the current therethrough exceeds a predetermined value. In the system used as an example the relay 22 may operate when the current therethrough exceeds 8 amperes. It will be apparent that when the source voltage is less than the value causing operation of relay 25, the contacts 31 thereof will be closed to bridge the resistor 23, and the relay 22 has no effect on the current path through the voltage regulator. This is illustrated in FIG. 2 wherein contacts 32 are closed because the current sensitive relay 22 has operated. However, since the resistor 23 is already bridged out by contacts 31, the contacts 32 have no effect. It is to be pointed out that when the transmitter operates, it will initially draw heavy curren which will cause the relay 22 to close. Accordingly, a relay may be used having a relatively high pull-in current, but the relay must remain energized at a lower current so that it will be energized at all times that the transmitter is in operation. As stated above the relay should hold-in until the current drops below 8 amperes.

FIG. 3 illustrates the operation of the system when the voltage of the electrical system exceeds 14 volts. In such case the relay 25 will operate to open contacts 28 and de-energize relay 29. Accordingly contacts 31 will be open and resistor 23 will be effectively in the energizing circuit. When the current is low so that the relay 22 is not energized the resistor 23 will provide a voltage drop to reduce the voltage at terminal 24. As an example, the resistor 23 may have a value of .25 ohm. Inasmuch as the radio receiver draws from 5 to 7 amperes, a voltage drop of about 1½ volts will be produced across resistor 23 so that the voltage at terminal 24 will be 1½ volts less than the voltage applied to terminal 21.

FIG. 4 shows the connections when the voltage exceeds the predetermined value and heavy current is drawn. In such case contacts 31 will be open and contacts 32 will close. Contacts 32 connect resistor 33 across resistor 23 so that only a small drop in the voltage of the electrical system which is applied at terminal 21 will appear thereacross. Resistor 33 may have a small value to provide a very small voltage drop in the circuit from input terminal 21 to output terminal 24 so that voltage applied to the transmitter will be only slightly reduced. This is desired in the transmitting condition because the heavy current drawn causes a voltage drop in the power cabling to further reduce the voltage at the transmitter. The voltage drop in the cabling may be adequate so that the resistor 33 can be eliminated. It is pointed out that the resistor 33 will not be effective in any of the other conditions of the regulator stated, and this resistor can be provided or not depending upon the voltage desired at the transmitter when the voltage of the electrical system has a high value.

An alternate arrangement for providing small resistance in the energizing circuit during transmission when the source voltage is excessive is shown in FIG. 5. In this circuit the contacts 32 of relay 22 are connected only across part of resistor 23, being connected across the part 23a. When the relay 22 is operated by heavy current, and the relay 29 is released by excessive voltage, the part 23a of resistor 23 is shorted out and the part 23b is in the circuit. This will provide the required voltage drop when the load current flows through the circuit.

Another embodiment of the voltage regulator is illustrated in FIG. 6. In this figure the voltage sensitive relay 25 is connected to input terminal 21 as in the prior embodiments. The resistor 27 is omitted as this is not required if the relay 25 is designed to operate at the voltage of terminal 21. Relay 25 operates contacts 28 to control the energization of winding 35. A further winding 36 is connected in series with resistor 23 between the input terminal 21 and the output terminal 24 of the regulator. The windings 35 and 36 control a single pair of contacts 37 which are bridged across resistor 23. The contacts 37 will be closed by operation of either or both of windings 35 and 36 when the current therein reaches specified levels.

The system of FIG. 6 will operate in exactly the same manner as the system of FIG. 1, except that the resistor 33 of FIG. 1 is omitted. That is, when the voltage at terminal 21 exceeds 14 volts contacts 28 will open so that winding 35 is deenergized and resistor 23 drops the voltage applied to the load. If heavy current is drawn the winding 36 operates to close contacts 37 so that resistor 23 is bridged and full voltage is applied to the load. As previously stated the voltage drop in the cabling will reduce the voltage to a safe value. When the voltage at terminal 21 is less than about 13.5 volts, the relay 25 will be released to close contacts 28. This will energize coil 35 which closes contacts 37 to shunt out the resistor 23. Accordingly the full voltage at input terminal 21 will be applied to the output terminal 24. When, however, heavy current is drawn by the load, the current through 36 is sufficient to energize contacts 37 so that the resistor 23 is always shorted out.

The voltage regulator of the invention therefore is effective to reduce the voltage applied to the equipment energized when the source voltage is excessive. The voltage drop is controlled in accordance with the current drain to provide proper operation at different current loads. The voltage sensitive relay is accurate to provide operation at a desired level since it has only light contacts which control the slave relay having current carrying contacts.

We claim:

1. A voltage regulator circuit including in combination, an input terminal for connection to a voltage source having a variable potential, an output terminal for connection to equipment to be energized, resistor means, a current sensitive relay having a winding and normally open contacts controlled thereby, means connecting said winding and said resistor means in series from said input terminal to said output terminal, a voltage sensitive relay having a winding connected to said input terminal and normally closed contacts controlled thereby, a slave relay having a winding and normally open contacts controlled thereby, and energizing circuit for said slave relay for operating the same through said normally closed contacts of said voltage sensitive relay, and circuit means connecting said contacts of said current sensitive relay and said contacts of said slave relay in parallel across said resistor means, said current sensitive relay being operative to maintain said contacts thereof in a closed position and provide a continuous low impedance path across said resistor means whenever the current flowing from said input terminal to said output terminal exceeds a predetermined value, and said voltage sensitive relay operating whenever the voltage at said input terminal exceeds a given value to maintain said contacts thereof in an open position and thereby hold said slave relay in a de-energized condition so that said contacts of said slave relay open and thereby open the circuit across said resistor means through said slave relay contacts.

2. A voltage regulator circuit including in combination, an input terminal for connection to a voltage source having a variable potential, an output terminal for connection to equipment to be energized, resistor means, a current sensitive relay having a winding and normally open contacts controlled thereby, means connecting said winding and said resistor means in series from said input terminal to said output terminal, a voltage sensitive relay having a winding connected to said input terminal and normally closed contacts controlled thereby, a slave relay having a winding and normally open contacts controlled thereby, an energizing circuit for said slave relay including said normally closed contacts of said voltage sensitive relay, and circuit means connecting said contacts of said current sensitive relay and said contacts of said slave relay in parallel across said resistor means, said voltage sensitive relay being operative to hold open said contacts thereof and maintain said slave relay in a deenergized condition whenever the potential of the source is above a predetermined value, said contacts of said slave relay opening when said slave relay is deenergized to remove the connection across said resistor means provided thereby, said current sensitive relay being operative whenever the current drawn at the output terminal exceeds a predetermined value to provide a continuous connection across said resistor means.

3. A voltage regulator circuit including in combination, an input terminal for connection to a voltage source having a variable potential, and an output terminal for connection to equipment to be energized, resistor means, first current sensitive relay means having a winding and contacts controlled thereby, means connecting said winding and said resistor means in series from said input terminal to said output terminal, circuit means connecting said contacts of said first relay means across at least a portion of said resistor means, said first relay means being operative to close said contacts whenever the current through said winding exceeds a predetermined value, second voltage sensitive relay means having a winding connected to said input terminal and contacts controlled thereby, third slave relay means having a winding and contacts controlled thereby, an energizing circuit for said third relay means including said contacts of said second voltage sensitive relay means, said voltage sensitive relay means operating to hold open said contacts thereof to maintain said slave relay means in a deenergized condition whenever the voltage of said input terminal exceeds a predetermined value, and circuit means connecting said contacts of said third slave relay means across at least a portion of said resistor means, with said contacts of said slave relay means opening to connect said resistor means in the energizing circuit during the time said slave relay means is in the deenergized condition.

4. A voltage regulator circuit including in combination, an input terminal for connection to a voltage source having a variable potential, and an output terminal for connection to equipment to be energized, resistor means, first relay means having a winding and contacts controlled thereby, means connecting said winding and said resistor means in series from said input terminal to said output terminal, circuit means having resistance connecting said contacts of said first relay means across said resistor means, second relay means having a winding connected to said input terminal and contacts controlled thereby, third relay means having a winding and contacts controlled thereby, an energizing circuit for said third relay means including said contacts of said second relay means, and circuit means connecting said contacts of said third relay means across at least a portion of said resistor means, said contacts of said first relay means being normally open and being maintained in the closed position whenever the current flow from said input terminal to said output terminal exceeds a predetermined value, said contacts of said second relay being normally closed to energize said third relay means and being maintained in the open position whenever the voltage at said input terminal exceeds a given value to continuously deenergize said third relay means and cause said contacts thereof to be maintained in the open position.

5. A voltage regulator circuit for use with a radio transmitter-receiver apparatus which requires large energizing current when the transmitter is operating and less current when the receiver is operating, said regulator circuit including in combination, an input terminal for connection to a voltage source having a variable potential, an output terminal for connection to said radio equipment, resistor means, first relay means having a winding and contacts controlled thereby, means connecting said winding and said resistor means in series from said input terminal to said output terminal, circuit means connecting said contacts of said first relay means across a portion of said resistor means, second relay means having a winding connected to said input terminal and contacts controlled thereby, third relay means having a winding and contacts controlled thereby, an energizing circuit for said third relay means across said resistor means, said contacts of said first relay means being normally open and being maintained in the closed position whenever the current flow from said input terminal to said output terminal exceeds a predetermined value, said contacts of said second relay being normally closed to energize said third relay means and being maintained in the open position whenever the voltage at said input terminal exceeds a given value to hold said third relay means in a deenergized condition and cause said contacts thereof to remain open.

6. A voltage regulator circuit including in combination, an input terminal for connection to a voltage source having a variable potential, an output terminal for connection to equipment to be energized, a voltage sensitive relay having a winding connected to said input terminal and contacts controlled thereby, said contacts being normally closed and being maintained in the open position whenever the voltage at said input terminal exceeds a given value, a first winding, an energizing circuit for said first winding including said contacts of said voltage sensitive relay, said contacts of said voltage sensitive relay normally holding said first winding energized and opening when said voltage sensitive relay operates to deenergize said first winding, resistor means, a second winding connected in series with said resistor means between said input terminal and said output terminal, contact means responsive to energization of said first winding and to current through said second winding which exceeds a predetermined value, and circuit means connecting said contact means to said resistor means to provide an uninterrupted low impedance path across at least a portion of said resistor means.

7. A voltage regulator circuit for use with radio equipment and including in combination, an input terminal for connection to a voltage source having a variable potential, an output terminal for connection to the radio equipment to be energized, a voltage sensitive relay having a winding connected to said input terminal and normally closed contacts controlled thereby, relay means including first and second windings and contacts controlled thereby, an energizing circuit for said first winding including said normally closed contacts of said voltage sensitive relay, resistor means, means connecting said second winding and said resistor means in series between said input terminal and said output terminal, and circuit means connecting said contact means across said resistor means to provide a low impedance shunt path thereacross,, said voltage sensitive relay being operative to hold open said contacts thereof whenever the voltage of the source exceeds a predetermined value to thereby de-energize said first winding so that said contacts of said relay means may release to remove the shunt across said resistor means, said relay means responding to current through said second winding thereof to hold said contacts thereof in a closed position whenever the current execeeds a predetermined value and thereby establish the shunt across said resistor means.

References Cited in the file of this patent
UNITED STATES PATENTS

| | | |
|---|---|---|
| 1,158,001 | Neely | Oct. 26, 1915 |
| 2,315,625 | King | April 6, 1943 |
| 2,556,371 | Hussey | June 12, 1951 |
| 2,617,907 | Umbarger et al. | Nov. 11, 1952 |
| 2,846,639 | Read | Aug. 5, 1958 |
| 2,907,943 | Orvis | Oct. 6, 1959 |